(12) United States Patent
Choi et al.

(10) Patent No.: US 7,266,107 B2
(45) Date of Patent: Sep. 4, 2007

(54) APPARATUS AND METHOD FOR ALLOCATING A COMMON CHANNEL IN A CDMA MOBILE COMMUNICATION SYSTEM

(75) Inventors: Sung-Ho Choi, Songnam-shi (KR); Kook-Heul Lee, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 879 days.

(21) Appl. No.: 09/990,558

(22) Filed: Nov. 21, 2001

(65) Prior Publication Data

US 2002/0097740 A1    Jul. 25, 2002

(30) Foreign Application Priority Data

Nov. 23, 2000    (KR)    ................. 2000-70099

(51) Int. Cl.
*H04Q 7/28* (2006.01)
*H04B 7/216* (2006.01)

(52) U.S. Cl. .............. 370/341; 370/441; 455/452.2

(58) Field of Classification Search ............ 370/320, 370/329, 331, 332, 335, 336, 337, 338, 342, 370/348, 349, 437, 441, 341; 455/432.1, 455/432.3, 433, 436, 439, 442, 450, 452, 455/452.2
See application file for complete search history.

(56) References Cited

U.S. PATENT DOCUMENTS 6,594,238 B1 *    7/2003    Wallentin et al. ........... 370/252
6,724,813 B1 *    4/2004    Jamal et al. .................. 375/219
6,889,050 B1 *    5/2005    Willars et al. ............ 455/452.2
6,963,540 B2 *    11/2005    Choi et al. ................... 370/252
2001/0018345 A1 *    8/2001    Longoni et al. ............ 455/436
2002/0025815 A1 *    2/2002    Rune et al. .................. 455/436

FOREIGN PATENT DOCUMENTS

WO    WO 00/44191    7/2000
WO    WO 01/89235    11/2001

OTHER PUBLICATIONS

European Search Report dated Nov. 29, 2002, issued in a counterpart application, namely, Appln. No. 01127954.4.
"Universal Mobile Telecommunication System (UMTS); UTRAN Iur interface RNSAP Signalling," ETSI TS 125 423, V3.3.0, Sep. 2000.

* cited by examiner

*Primary Examiner*—Doris H. To
*Assistant Examiner*—Kerri M Rose
(74) *Attorney, Agent, or Firm*—The Farrell Law Firm (57) ABSTRACT

Disclosed is a method for setting a common channel for a packet data service by an SRNC through a UE and a DRNC when the UE is handed over from a first Node B to a second Node B as the UE moves to the second Node B, in a mobile communication system. The SRNC transmits service parameters including bit rate information for the packet data service to the DRNC, and receives information on a common channel determined based on the service parameters from the DRNC. The SRNC transmits information on the determined common channel to the UE through the DRNC and the second Node B, to allocate the determined common channel to the UE.

12 Claims, 5 Drawing Sheets

APPARATUS AND METHOD FOR ALLOCATING A COMMON CHANNEL IN A CDMA MOBILE COMMUNICATION SYSTEM

PRIORITY

This application claims priority to an application entitled "Apparatus and Method for Allocating Common Channel in a CDMA Mobile Communication System" filed in the Korean Industrial Property Office on Nov. 23, 2000 and assigned Ser. No. 2000-70099, the contents of which are hereby incorporated by reference.

BACKGROUND OF THE INVENTION

1. Field of the Invention

The present invention relates generally to a method for allocating a common channel in a CDMA (Code Division Multiple Access) mobile communication system, and in particular, to an apparatus and method for allocating a common channel in the case that a serving radio network controller (SRNC) is different from a drift radio network controller (DRNC).

2. Description of the Related Art

With the rapid development of the mobile communication industry, a future mobile communication system will provide not only a voice (circuit) service but also advanced services such as a data service and an image service. Generally, the future mobile communication system employs a CDMA (Code Division Multiple Access) system. The CDMA system is classified into a synchronous system and an asynchronous system. The synchronous system is chiefly adopted in United States, while the asynchronous system is mainly adopted in Europe and Japan. However, the standardization work on the future mobile communication system is being separately carried out for the synchronous system and the asynchronous system. The European future mobile communication system is called "UMTS (Universal Mobile Telecommunication System)".

The standardization provides various specifications for the data service and the images service as well as the voice service, required in the future mobile communication system, and particularly, for channel allocation.

A UMTS W-CDMA (Wideband Code Division Multiple Access) communication system, the European future mobile communication system, uses a random access channel (RACH) and a common packet channel (CPCH) as a reverse common channel, and uses a forward access channel (FACH) as a forward common channel.

Among the reverse common channels of the W-CDMA communication system, the RACH can have characteristics dependent on a TTI (Transmit Time Interval) and a channel coding mode, and is mapped with a physical random access channel (PRACH) on a one-to-one basis. Further, the PRACH can have characteristics being dependent on available signatures and an access sub-channel. Therefore, the RACHs can be distinguished (identified) based on the TTI and the channel coding mode, while the PRACHs can be distinguished according to the number of available signatures and the access sub-channel. In addition, an available spreading factor (SF) can be also used in distinguishing the PRACHs.

As the RACHs and PRACHs have various characteristics, they can be used for different purposes according to their service types. In addition, information on the RACH/PRACH is broadcast by a Node B, and upon receiving the RACH/PRACH information, a UE can select which RACH/PRACH to use depending on the received RACH/PRACH information. Alternatively, the Node B can select the RACH/PRACH to be used by a specific UE based on a service to be used by the UE, and then inform the UE of the selected RACH/PRACH.

Like the RACH, the FACH and the CPCH also have different characteristics to provide different services, so that the UE can select proper FACH and CPCH according to the characteristics of the FACH and CPCH provided from the Node B. Alternatively, the Node B can determine the FACH and the CPCH to be used by the UE and then transmit information on the determined FACH and CPCH to the UE.

Meanwhile, common channels such as the RACH, the FACH and the CPCH are allocated to the UEs by a serving radio network controller (SRNC). The SRNC connected to a core network (CN) exchanges information on a service provided between the UE and the CN. The SRNC determines a channel to be allocated to the UE using the service information transmitted from the CN.

Shown in Tables 1A to 1C are RAB (Radio Access Bearer) parameters of a service information message used by the CN to inform the SRNC of the service information.

TABLE 1A

| IE/Group Name | Presence | Range | IE type and reference | Semantics description |
|---|---|---|---|---|
| RAB parameters | | | | |
| >Traffic Class | M | | ENUMERATED (conversational, streaming, interactive, background, . . . ) | Desc.: This IE indicates the type of application for which the Radio Access Bearer service is optimised |
| >RAB Asymmetry Indicator | M | | ENUMERATED (Symmetric bidirectional, Asymmetric Unidirectional downlink, Asymmetric Unidirectional Uplink, Asymmetric Bi-directional, . . . ) | Desc.: This IE indicates asymmetry or symmetry of the RAB and traffic direction |

TABLE 1B

| | | | | |
|---|---|---|---|---|
| >Delivery Order | M | | ENUMERATED (delivery order requested, delivery order not requested) | Desc.: This IE indicates that whether the RAB shall provide in-sequence SDU delivery or not Usage: Delivery order requested: in sequence delivery shall be guaranteed by UTRAN on all RAB SDUs Delivery order not requested: in sequence delivery is not required from UTRAN |
| >Maximum SDU size | M | | INTEGER (0.32768) | Desc.: This IE indicates the maximum allowed SDU size The Unit is: bit. Usage: Conditional value: set to largest RAB Subflow Combination compound SDU size when present among the different RAB Subflow Combination |
| >SDU parameters | | 1 to <maxRABSubflows> | See below | Desc.: This IE contains the parameters characterizing the RAB SDUs Usage: Given per subflow with first occurrence corresponding to subflow#1 etc* |
| >Transfer Delay | C-iftrafficConv-Stream | | INTEGER (0.65535) | Desc.: This IE indicates the maximum delay for 95th percentile of the distribution of delay for all delivered SDUs during the lifetime of a RAB, where delay for an SDU is defined as the time from a request to transfer an SDU at one SAP to its delivery at the other SAP The unit is: millisecond. Usage: |

TABLE 1C

| | | | |
|---|---|---|---|
| >Traffic Handling priority | C-iftraffic-Interactiv | INTEGER {spare (0), highest (1), lowest (14), no priority used (15)} (0?5) | Desc.: This IE specifies the relative importance for handling of all SDUs belonging to the radio access bearer compared to the SDUs of other bearers Usage: |
| >Allocation/ Retention priority | O | See below | Desc.: This IE specifies the relative importance compared to other Radio access bearers for allocation and retention of the Radio access bearer. Usage: If this IE is not received, the request is regarded as it cannot trigger the preemption process and it is vulnerable to the preemption process. |
| >Source Statistics descriptor | C-iftraffic-Conv-stream | ENUMERATED (speech, unknown, ? | Desc.: This IE_specifies characteristics of the source of submitted SDUs Usage: |

The SRNC selects a dedicated channel (DCH) or a common channel using the RAB parameters shown in Tables 1A to 1C. If the common channel is selected, the SRNC can select the RACH or the CPCH in response to a service request. In addition, a maximum bit rate and a guaranteed bit rate are used in selecting a minimum SF and a channelization code to be used by the common channel. That is, the SF and the channelization code to be used by the common channel are determined depending on the maximum bit rate and the guaranteed bit rate. Here, the maximum bit rate and the guaranteed bit rate are bit rate information of the packet data.

In addition, a traffic handling priority and a transfer delay are selected based on the characteristics of the physical channel, i.e., based on the sub-channel and the number of signatures.

When the UE, with a channel allocated by the SRNC, performs a handover (or handoff), a DRNC, an RNC of a Node B newly accessed by the UE, and the SRNC may be changed. The SRNC and the DRNC are distinguished from the viewpoint of the UE. If the SRNC is connected to the UE not directly, but through the DRNC, then the SRNC cannot personally select a channel and allocate the selected channel to the UE.

The reasons that the SRNC cannot personally allocate a channel to the UE are as follows.

First, channels allocated to a cell in the DRNC are determined by the DRNC, because the SRNC does not have information on the allocated common channel in the DRNC. For this reason, the SRNC cannot determine a common channel allocated to the cell in the DRNC. Second, the DRNC or the CN does not have information on a service provided to the UE, so it is difficult to allocate a common channel to be used by the UE. Thus, conventionally, when the SRNC is connected to the UE through the DRNC, i.e., when the UE performs a handover, the UE cannot be allocated a common channel.

SUMMARY OF THE INVENTION

It is, therefore, an object of the present invention to provide a method in which a serving radio network controller (SRNC) shares service information provided from a core network, so that a drift radio network controller (DRNC) can allocate a common channel to a UE.

It is another object of the present invention to provide a method in which an SRNC provides a signaling message having service information received from a CN to a DRNC, so that the SRNC and the DRNC exchange information required in allocating a common channel to a specific UE handed over from the SRNC to the DRNC.

To achieve the above and other objects, there is provided a method for setting a common channel for a packet data service by an SRNC through a Node B to a UE and a DRNC when the UE is handed over from a first Node B to a second Node B as the UE moves to the second Node B, in a mobile communication system. The mobile communication system includes the UE, the first Node B providing the packet data service to the UE, the SRNC connected to the first Node B, and a CN (Core Network) connected to the SRNC. The CN has bit rate information for the packet data service and transmits the bit rate information to the SRNC. The SRNC stores the bit rate information. The DRNC is connected to the second Node B neighboring the first Node B and also connected to the SRNC. The SRNC transmits service parameters including the bit rate information for the packet data service to the DRNC, and receives information on a common channel determined based on the service parameters from the DRNC. The SRNC transmits information on the determined common channel to the UE through the DRNC and the second Node B, to allocate the determined common channel to the UE.

Preferably, the bit rate information includes a maximum bit rate and a guaranteed bit rate.

Preferably, the common channel includes a common packet channel (CPCH), a random access channel (RACH) or a forward access channel (FACH).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides two different embodiments for allocating a common channel to a UE in the case where an SRNC to which the UE belongs is different from a DRNC.

In a first embodiment, the SRNC transmits service information received from a CN to the DRNC. Upon receiving the service information, the DRNC selects a common channel based on the received service information and then allocates the selected common channel to the UE.

In a second embodiment, the SRNC selects a common channel service information received from the CN and transmits information on the selected common channel to the DRNC. Upon receiving the information on the common channel, the DRNC allocates a common channel to the UE based on the received common channel information. In the first and second embodiments, the common channel selected by the SRNC may be identical to or different from the common channel selected by the DRNC.

A description of the first embodiment will be given herein below As stated above, the service information transmitted from the CN to the SRNC is shown Tables 1A to 1C. In this embodiment, the SRNC should transmit the service information received from the CN to the DRNC. Thus, a definition of a message transmitted from the SRNC to the DRNC will be given.

The SRNC can transmit the service information received from the CN to the DRNC by including it in a Common Transport Channel Resources Request message. The SRNC transmits some or all of the service information received from the CN to the DRNC, using the Common Transport Channel Resources Request message. Upon receiving the Common Transport Channel Resources Request message, the DRNC detects the service information included in the received Common Transport Channel Resources Request message. The DRNC then allocates a common transport channel or a common physical channel to the UE based on the detected service information. Shown in Table 2 is a format of the Common Transport Channel Resources Request message according to the first embodiment of the present invention.

TABLE 2

| IE/Group Name | Presence | Range | IE type and reference | Semantics description | Critically | Assigned Critically |
|---|---|---|---|---|---|---|
| Message Type | M | | 9.2.1.40 | | YES | Reject |
| Transaction ID | M | | 9.2.1.59 | | YES | Reject |
| D-RNTI | M | | 9.2.1.25 | | YES | Reject |
| C-ID | O | | 9.2.1.61 | Request a new transport bearer or to use an existing bearer for the user plane | YES | Reject |
| Transport Bearer Request Indicator | M | | 9.2.1.60 | Indicates the Iur transport bearer to be used for the user plane | YES | Reject |
| Transport Bearer ID | M | | | | | |
| RAB information | | 0 . . . 1 | | | | |
| >Traffic Class | O | | | | | |
| >RAB Asymmetry Indicator | O | | | | | |

TABLE 2-continued

| IE/Group Name | Presence | Range | IE type and reference | Semantics description | Critically | Assigned Critically |
|---|---|---|---|---|---|---|
| >Maximum Bit Rate | O | | | | | |
| >Guaranteed Bit Rate | O | | | | | |
| >Delivery Order | O | | | | | |
| >Transfer Delay | O | | | | | |
| >Traffic Handling priority | O | | | | | |
| >Allocation/Retention priority | O | | | | | |
| >Priority level | O | | | | | |
| >Pre-emption Capability | O | | | | | |
| >Pre-emption Vulnerability | O | | | | | |
| >Queuing allowed | O | | | | | |

Table 2 shows some of the service information received from the CN. Specially, it is noted that in table 2, parameters mentioned following "the RAB information" row, i.e., from ">Traffic Class" to ">Queuing Allowed", can be included in the RAB information and thus, they can be grouped in the RAB information. That is, in selecting service information required for selecting a common channel, the SRNC may select all of the service information received from the CN or partially selects only the necessary information shown in Table 2.

The service information required by the DRNC in allocating a common channel to the UE includes the following parameters that should be transmitted from the SRNC to the DRNC.

(1) Maximum Bit Rate

The maximum bit rate represents a requirement for a maximum value of a bit rate of data to be transmitted/received over the common channel. Therefore, upon receiving the maximum bit rate, the DRNC allocates the common channel within a range not exceeding the maximum bit rate. This is because the maximum bit rate can become a criterion for determining a spreading factor (SF) indicating a bit rate for a physical channel. Therefore, the maximum bit rate can become a criterion for selecting a random access channel (RACH) rather than a common packet channel (CPCH), for the SF<32.

(2) Guaranteed Bit Rate

The guaranteed bit rate represents a requirement for a guaranteed value of a bit rate of data to be transmitted/received over the common channel. Therefore, upon receiving the guaranteed bit rate, the DRNC allocates the common channel within a range capable of guaranteeing the received guaranteed bit rate. For example, if the received guaranteed bit rate requires a spreading factor SF=16, the DRNC allocates the CPCH rather than the RACH. In addition, the DRNC allocates a CPCH set capable of supporting the SF=16 among CPCH sets. Likewise, even in the case of a forward access channel (FACH), the DRNC allocates a secondary common control physical channel (S-CCPCH) capable of supporting the spreading factor SF=16.

In addition to the maximum bit rate and the guaranteed bit rate, the service information required by the DRNC in allocating a common channel to the UE includes Traffic Class, RAB Asymmetry Indicator, Delivery Order Transfer Delay, Traffic Handling Priority, and Allocation/Retention Priority parameters. These parameters can be used by the DRNC as criterions for selecting a common channel.

Figure 1:
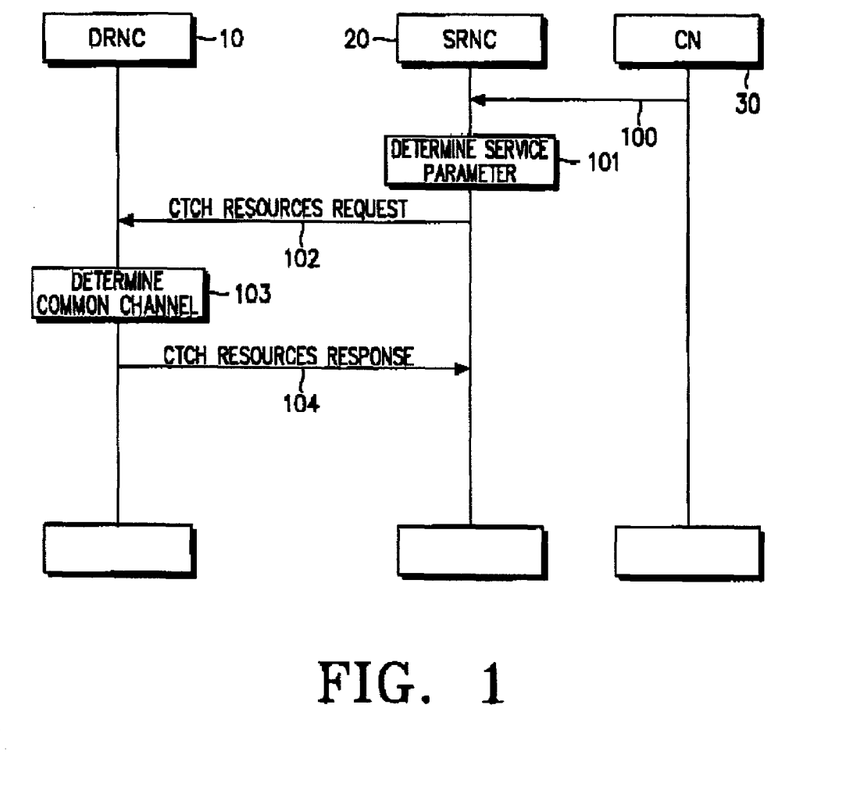
FIG. 1 illustrates a method for allocating a common channel to a UE in the case where an SRNC is different from a DRNC, according to an embodiment of the present invention.

FIG. 1 illustrates a method for allocating a common channel to a UE in the case where an SRNC is different from a DRNC, according to an embodiment of the present invention. Referring to FIG. 1, upon receiving an RAB parameter message with service information from a CN 30 (Step 100), an SRNC 20 determines service parameters to be transmitted to a DRNC 10 among the service information (or service parameters) included in the received RAB parameter message (Step 101). As mentioned above, however, the SRNC 20 can also select a specific common channel among available common channels and transmit the selected common channel. For example, in the case of an uplink, the SRNC 20 can previously determine (select) a common channel to be used between the RACH and the CPCH, and then transmit information of the determined common channel. In this case, the SRNC 20 must recognize whether the DRNC 10 provides the CPCH.

After determining the service parameters to be transmitted to the DRNC 10 among the service parameters received from the CN 30, the SRNC 20 transmits the determined service parameters or information on the type of the selected common channel to the DRNC 10 along with a Common Transport Channel Resources Request message (Step 102). Of course, it is also possible to define a new procedure instead of using the Common Transport Channel Resources Request message.

Upon receiving the Common Transport Channel Resources Request message from the SRNC 20, the DRNC 10 determines a common channel to be used by the UE by detecting the service parameters included in the received Common Transport Channel Resources Request message and analyzing the detected service parameters (Step 103). The DRNC 10 can also determine the common channel to be allocated to the UE considering a current state of the common channels in addition to the service parameters included in the received Common Transport Channel Resources Request message. That is, the DRNC 10 can select a common channel less frequently used by other UEs among a plurality of available common channels.

After determining the common channel to be allocated to the UE, the DRNC 10 transmits information on the determined common channel to the SRNC 20 along with a Common Transport Channel Resources Response message (Step 104). The Common Transport Channel Resources Response message may include additional information such as information on a transport channel and a physical channel of the determined common channel, or its priority.

A procedure for transmitting the service parameters from the SRNC 20 to the DRNC 10 and a procedure for determining a common channel by the DRNC 10 using the service parameters received from the SRNC 20 will be described in detail with reference to FIGS. 2 and 3, respectively.

Figure 2:
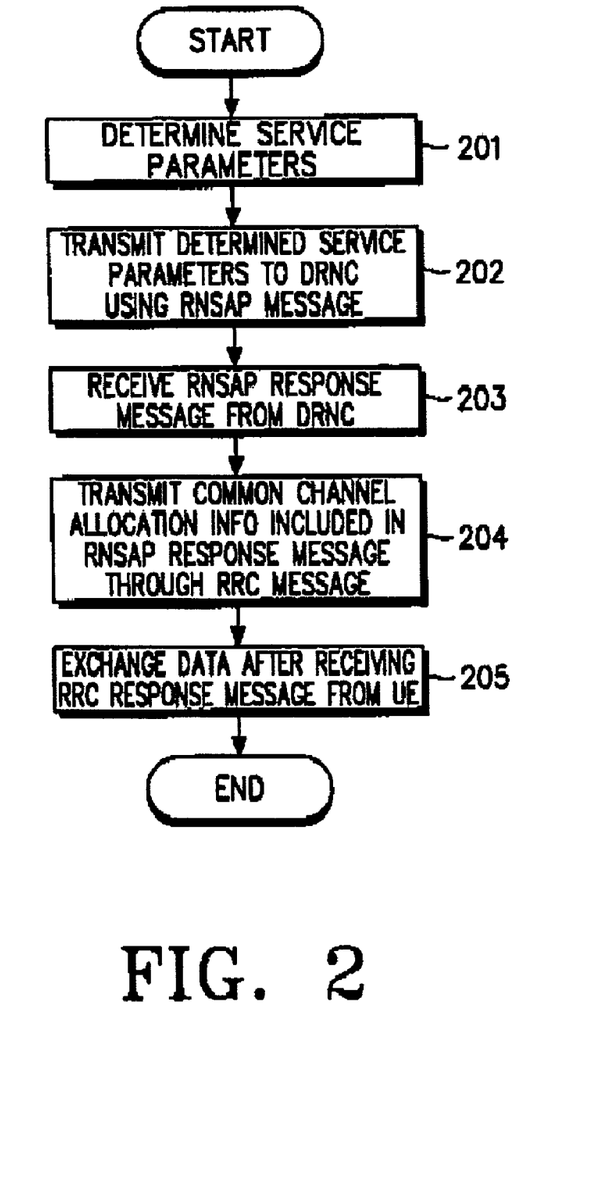
FIG. 2 illustrates a procedure for transmitting service parameters required for allocating a common channel from the SRNC to the DRNC according to an embodiment of the present invention.

FIG. 2 illustrates a procedure for transmitting service parameters required for allocating a common channel from the SRNC to the DRNC according to an embodiment of the present invention. Referring to FIG. 2, in step 201, the SRNC 20 determines service parameters to be transmitted to the DRNC 10 among service parameters included in a RAB parameter message received from the CN 30. Here, the SRNC 20 can select partial service parameters shown in Table 2 from the service parameters included in the RAB parameter message, as the service parameters to be transmitted to the DRNC 10. For example, the service parameters to be transmitted to the DRNC 10 may include the maximum bit rate or the guaranteed bit rate. The service parameters transmitted from the SRNC 20 to the DRNC 10 are service parameters decided to be necessarily considered by the DRNC 10 in determining the common channel.

In step 202, the SRNC 20 transmits the determined service parameters to the DRNC 10 along with an RNSAP (Radio Network Subsystem Application Part) signaling message. For example, the RNSAP signaling message used to transmit the service parameters may be a Common Transport Channel Resources Request message.

In step 203, the SRNC 20 receives an RNSAP Response signaling message from the DRNC 10 in response to the Common Transport Channel Resources Request message.

In step 204, the SRNC 20 detects information on a common channel to be allocated by the DRNC 10 to the UE included in the received RNSAP Response signaling message by analyzing the RNSAP Response signaling message, and transmits the detected common channel information to the UE using an RRC (Radio Resource Control) message.

In step 205, upon receiving an RRC Response message from the UE in response to the RRC message, the SRNC 20 starts exchanging data from the DRNC 10 with the CN 30, and then ends the procedure after the data exchange.

Figure 3:
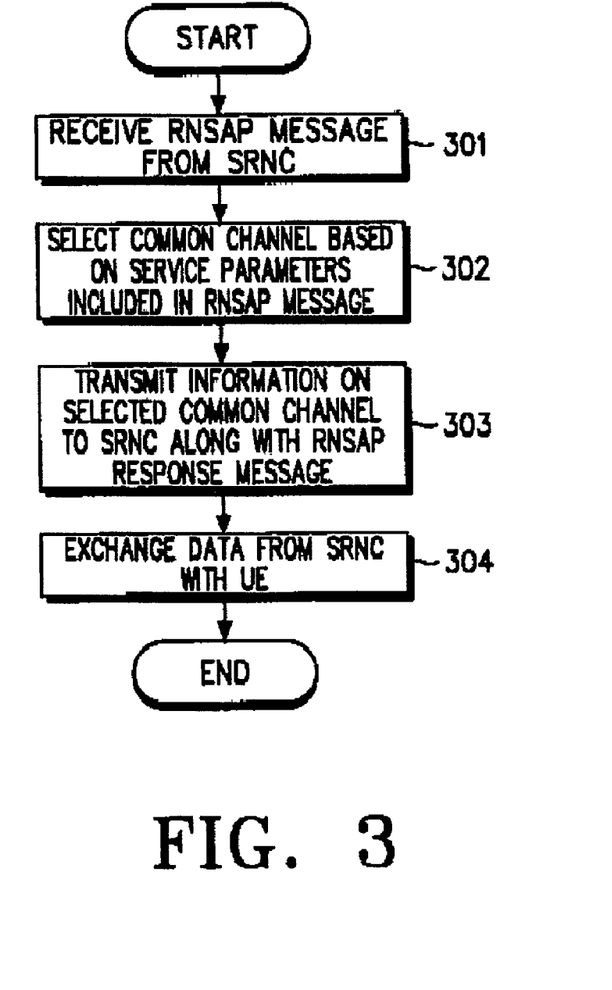
FIG. 3 illustrates a procedure for transmitting information required for allocating a common channel from the DRNC to the SRNC according to an embodiment of the present invention.

FIG. 3 illustrates a procedure for transmitting information required for allocating a common channel from the DRNC to the SRNC according to an embodiment of the present invention. Referring to FIG. 3, in step 301, the DRNC 10 receives an RNSAP signaling message from the SRNC 20. In step 302, the DRNC 10 detects service parameters included in the received RNSAP signaling message, i.e., a Common Transport Channel Resources Request message, analyzes the detected service parameters, and then determines a common channel to be allocated to the UE based on the analyzed service parameters. In the case of the uplink, the DRNC 10 selects a common channel to be used out of the RACH and the CPCH, and then determines the most preferred common channel among PRACHs currently available in the DRNC 10 or the CPCH sets for the respective cases, based on the received service parameters. Alternatively, the DRNC 10 can determine a common channel to be allocated to the UE considering a state of the common channels currently in use.

In step 303, the DRNC 10 transmits information on the determined common channel to the SRNC 20 along with an RNSAP Response signaling message, a response message replying to the RNSAP signaling message received from the SRNC 20. The DRNC 10 starts exchanging data from the SRNC 20 with the UE in step 304, and then ends the procedure after the data exchange.

Next, upon receiving an RAB parameter message from the CN 30, the SRNC 20 selects the type of a common channel to be allocated to the UE based on the service parameters included in the received RAB parameter message, and then transmits the service parameters for the selected common channel and the corresponding information to the DRNC 10. The DRNC 10 then allocates a common channel to the UE based on the type of the common channel and the service parameters, received from the SRNC 20. This procedure will be described in detail with reference to FIGS. 4 and 5.

Figure 4:
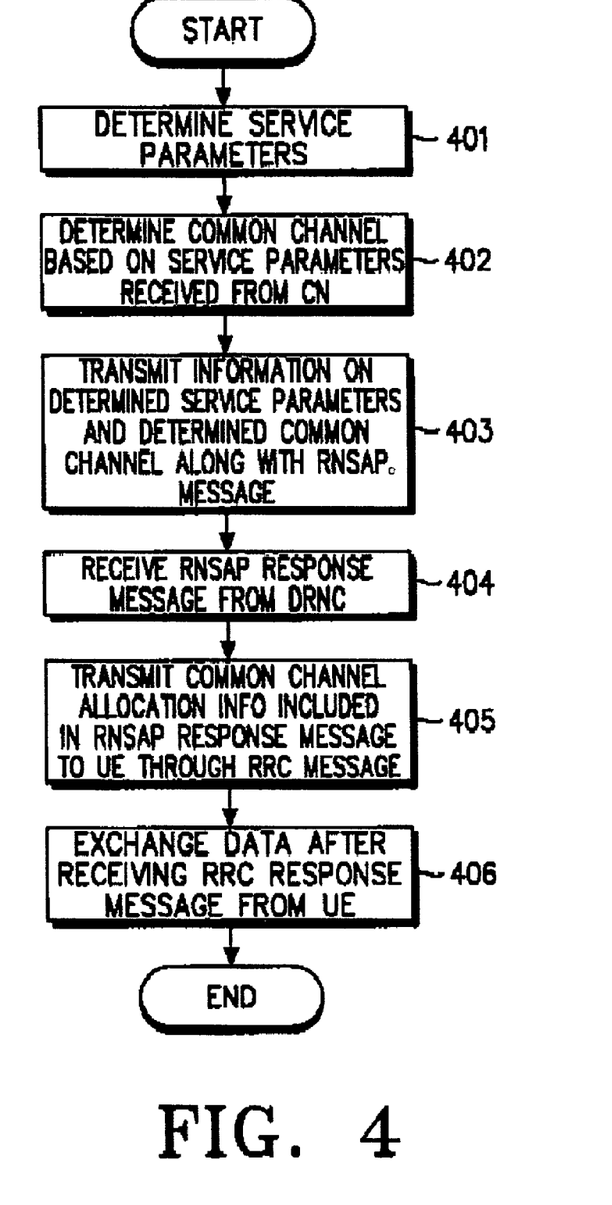
FIG. 4 illustrates a procedure for transmitting the service parameters required for allocating a common channel from the SRNC to the DRNC according to another embodiment of the present invention.

FIG. 4 illustrates a procedure for transmitting the service parameters required for allocating a common channel from the SRNC to the DRNC according to another embodiment of the present invention. Referring to FIG. 4, upon receiving a RAB parameter message from the CN 30, the SRNC 20 determines service parameters to be transmitted to the DRNC 10 among service parameters included in the received RAB parameter message in step 401. Likewise, the service parameters to be transmitted from the SRNC 20 to the DRNC 10 may include some of the service parameters included in the RAB parameter message. For example, the service parameters transmitted to the DRNC 10 may include the maximum bit rate or the guaranteed bit rate. Such service parameters are service parameters decided to be necessarily considered by the DRNC 10 in determining the common channel.

In step 402, the SRNC 20 selects the type of a common channel to be allocated to the UE based on the service parameters included in the received RAB parameter message. Here, if the common channel to be allocated to the UE is a downlink common channel, the step 402 can be omitted because only one type of the common channel is defined currently. This is because the currently defined downlink common channel includes only the FACH. However, the currently defined uplink common channel includes the RACH and the CPCH. Therefore, the SRNC 20 can first select a preferred common channel out of the two common channels, based on the service parameters included in the RAB parameter message received from the CN 30, and then send a request for the selected common channel to the DRNC 10. Here, the SRNC 20 must previously recognize whether the DRNC 10 supports the CPCH.

In step 403, the SRNC 20 transmits the determined service parameters and the common channel information to the DRNC 10 along with the RNSAP signaling message. For example, the RNSAP signaling message used in transmitting the service parameters and the common channel information may be a Common Transport Channel Resources Request message.

In step 404, the SRNC 20 receives an RNSAP Response signaling message, a response message answering to the RNSAP signaling message, from the DRNC 10. The received RNSAP Response signaling message, i.e., a Common Transport Channel Resources Response message, includes information on the common channel determined by the DRNC 10.

In step 405, the SRNC 20 detects information on the common channel determined by the DRNC by analyzing the RNSAP Response signaling message, and then transmits the detected information to the UE along with an RRC message. In step 406, upon receiving an RRC Response message, a response message replying to the transmitted RRC message, from the UE, the SRNC 20 starts exchanging data with the CN 30 and the DRNC 10, and then ends the procedure after the data exchange.

Figure 5:
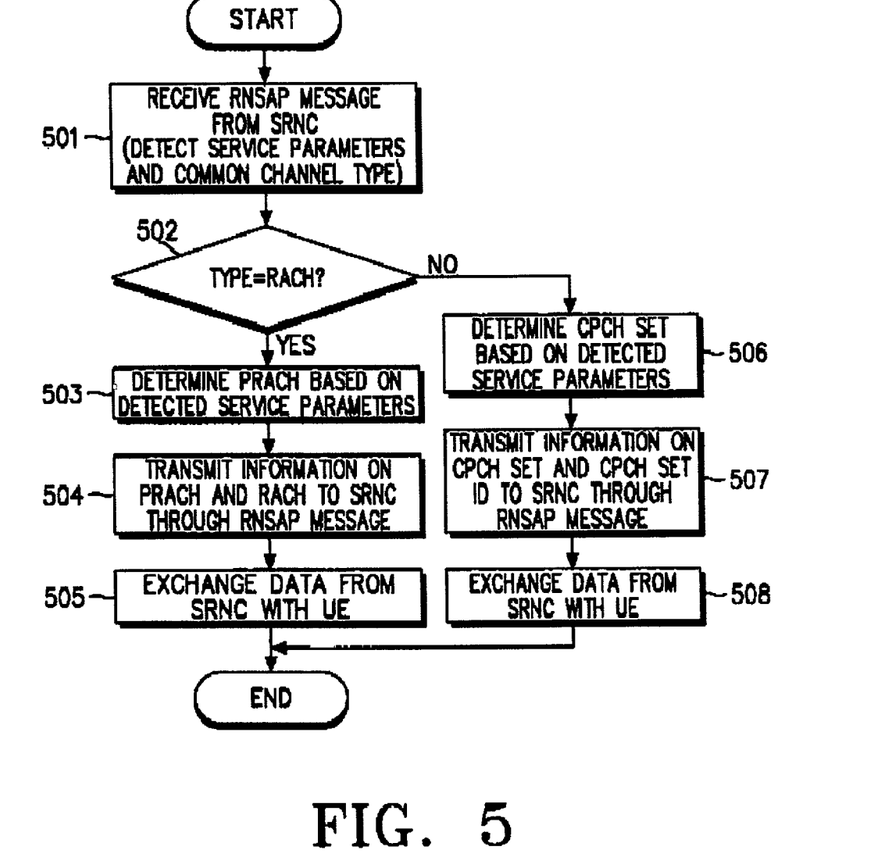
FIG. 5 illustrates a procedure for transmitting information required for allocating a common channel from the DRNC to the SRNC according to another embodiment of the present invention.

FIG. 5 illustrates a procedure for transmitting information required for allocating a common channel from the DRNC to the SRNC according to another embodiment of the present invention. Referring to FIG. 5, in step 501, the DRNC 10 receives an RNSAP signaling message, i.e., the Common Transport Channel Resources Request message, from the SRNC 20. The DRNC 10 detects service parameters and the type of the common channel from the received Common Transport Channel Resources Request message.

In step 502, the DRNC 10 determines whether the type of the common channel included in the Common Transport Channel Resources Request message is an RACH, given that the common channel allocated to the UE is an uplink common channel. Thus, the DRNC 10 determines whether the type of the common channel allocated by the SRNC 20 is an RACH. As a result of the determination, if the type of the common channel is the RACH, the DRNC 10 proceeds to step 503. Otherwise, if the type of the common channel is not the RACH, but the CPCH, then the DRNC 10 proceeds to step 506. In addition, if the common channel to be allocated to the UE is a downlink common channel, the SRNC 20 is not required to separately determine the type of the common channel as shown in FIGS. 2 and 3, because the downlink common channel includes only the FACH.

In step 503, the DRNC 10 determines a PRACH based on the detected service parameters. Here, the DRNC 10 determines a PRACH among PRACHs defined in the DRNC 10 based on the service parameters detected from the RAB parameter message. Further, the DRNC 10 determines a PRACH for the UE considering a state of the PRACHs currently in use.

Next, in step 504, the DRNC 10 transmits information on the determined PRACH and its associated RACH to the SRNC 20 along with an RNSAP Response message, i.e., the Common Transport Channel Resources Response message. In step 505, the DRNC 10 starts exchanging data with the UE and the SRNC 20, and then ends the procedure after the data exchange.

Meanwhile, if it is determined in step 502 that the type of the common channel is not the RACH, the DRNC 10 determines a CPCH set based on the detected service parameters in step 506. Here, the DRNC 10 determines a preferred CPCH set among CPCH sets defined in the DRNC 10, based on the detected service parameters. Alternatively, the DRNC 10 can also select a CPCH set to be allocated to the UE considering a state of the CPCH sets currently in use. Since the CPCH sets have different characteristics, the DRNC 10 can determine a preferred CPCH set considering the detected service parameters such as the maximum bit rate.

In step 507, the DRNC 10 transmits information on the determined CPCH set and the determined CPCH set's ID to the SRNC 20 along with an RNSAP Response signaling message, i.e., the Common Transport Channel Resources Response message. In step 508, the DRNC 10 starts receiving a CPCH from the UE and transmitting the received CPCH to the SRNC 20, and then ends the procedure after the data transmission.

Next, a detailed description will be made of a method for selecting the CPCH among the common channels and then allocating the selected CPCH. In general, as for the CPCH, a plurality of CPCH sets are included in the DRNC, and the DRNC allocates different CPCH sets according to the services. In this case, in order to determine a proper CPCH set for a specific UE, the DRNC should be provided with information on the service requested or received by the UE from the SRNC. Shown in Table 3 is information on the CPCH sets included in the DRNC.

TABLE 3

| CPCH Set | Minimum SF | Num of PCPCH | TTI | Channel Coding | Num of Signatures |
|---|---|---|---|---|---|
| CPCH Set 1 | SF4 | 4 | 10 ms | 1/3 turbo coding | 8 |
| CPCH Set 2 | SF8 | 8 | 10 ms | 1/3 turbo coding | 8 |
| CPCH Set 3 | SF8 | 16 | 20 ms | 1/2 convolution coding | 16 |
| CPCH Set 4 | SF16 | 32 | 20 ms | 1/2 convolution coding | 16 |

Referring to Table 3, the DRNC has 4 CPCH sets included in its cell, and the CPCH sets have different information on the minimum SF value, the number of physical common packet channels (PCPCHs), the TTI value of transport format set information, and the number of signatures available for the CPCPH set. As a result, the UEs allocated different CPCH sets are provided with the services having different bit rates.

The DRNC uses the maximum bit rate included in the RNSAP signaling message received from the SRNC in order to allocate a specific CPCH set to a specific UE among the CPCH sets allocated to the DRNC itself. Upon receiving the maximum bit rate, the DRNC selects a CPCH set capable of supporting the received maximum bit rate among the CPCH sets currently included in the DRNC, and transmits information on the selected CPCH set to the SRNC.

Shown in Table 4 are bit rates available for the respective SF values.

TABLE 4

| SF | Channel Bit Rate | Data Bit Rate (½ coding) | Data Bit Rate (⅓ coding) |
|---|---|---|---|
| 4 | 960 Kbps | 480 Kbps | 320 Kbps |
| 8 | 480 Kbps | 240 Kbps | 160 Kbps |
| 16 | 240 Kbps | 120 Kbps | 80 Kbps |
| 32 | 120 Kbps | 60 Kbps | 40 Kbps |
| 64 | 60 Kbps | 30 Kbps | 20 Kbps |
| 128 | 30 Kbps | 15 Kbps | 10 Kbps |
| 256 | 15 Kbps | 7.5 Kbps | 5 Kbps |
| ... | ... | ... | ... |

Table 4 shows the bit rates available for the respective SF values according to the coding rates. For example, if SF=4, the original channel bit rate is 960 Kbps and the bit rate is 480 Kbps for ½ coding and 320 Kbps for ⅓ coding.

Next, shown in Table 5 are maximum bit rates and associated CPCH sets available for (or allocable to) the corresponding maximum bit rates.

TABLE 5

| Max Bit Rate | Min SF with ½ coding | Min SF with ⅓ coding | Available CPCH sets |
| --- | --- | --- | --- |
| 5.15 Kbps | 256 | 128 | CPCH set 1, 2, 3, 4 |
| 12.2 Kbps | 128 | 64 | CPCH set 1, 2, 3, 4 |
| 14.4 Kbps | 64 | 64 | CPCH set 1, 2, 3, 4 |
| 28.8 Kbps | 64 or 32 | 32 | CPCH set 1, 2, 3, 4 |
| 57.6 Kbps | 32 or 16 | 32 | CPCH set 1, 2, 3, 4 |
| 32 Kbps | 32 | 32 | CPCH set 1, 2, 3, 4 |
| 64 Kbps | 16 | 32 | CPCH set 1, 2, 3, 4 |
| 128 Kbps | 8 | 8 | CPCH set 1, 2, 3 |
| 384 Kbps | 4 | 4 | CPCH set 1 |
| ... | ... | ... | ... |

Table 5 shows relationships between the maximum bit rates and associated CPCH sets available for the maximum bit rates, based on Tables 3 and 4. For example, the CPCH set 4 is larger than the CPCH set 3, the CPCH set 3 is larger than the CPCH set 2, and the CPCH set 2 is larger than the CPCH set 1 in the number of available CPCHs. Therefore, when the CPCH sets can be simultaneously allocated, it is possible to set an allocation probability of the CPCH set 2 to be higher than that of the CPCH set 1, an allocation probability of the CPCH set 3 to be higher than that of the CPCH set 2, and an allocation probability of the CPCH set 4 to be higher than that of the CPCH set 3. That is, in FIG. 5, it is preferable to allocate the CPCH set 3 to the UE with the maximum bit rate of 128 Kbps. In addition, it is preferable to allocate the CPCH set 4 to the UE with the maximum bit rate of 64 Kbps.

If the SRNC designates a service parameter for a specific UE among the service parameters included in the RAB parameter message received from the CN as the maximum bit rate in an RNSAP signaling message for common channel allocation and transmits the RNSAP signaling message to the DRNC, then the DRNC determines a CPCH set proper for the maximum bit rate parameter in the RNSAP signaling message among the CPCH sets previously included in the DRNC, and then transmits information on the determined CPCH set to the SRNC. Here, a CPCH set ID can be used for the information on the determined CPCH set. The SRNC transmits the received CPCH set ID to the UE using an RRC message.

The UE then recognizes information on the CPCH set through system information received over a broadcast channel (BCH) from the corresponding cell, and then initiates transmission of the CPCH signal using the received CPCH set information.

Further, the DRNC can transmit the whole information on the CPCH set to the SRNC along with a CPCH set ID for the determined CPCH. In this case, the SRNC can receive the whole information on the CPCH set for the UE through an RRC message. Therefore, the UE can recognize information on the CPCH set even without receiving the BCH information. Specifically, when a UE transitions from a CELL_DCH state to a CELL_FACH state, the UE can receive information on the common channel to be used in the CELL_FACH state, directly through RRC message not through the BCH. That is, when the SRNC has the service parameters for the UE and the UE performs a handover in a "connected mode" where the UE is connected to a common radio resource, the UE can receive information on the common channel directly through the RRC message and construct the common channel.

In addition, when the DRNC transmits only specific information of the information on the CPCH set to the SRNC along with the CPCH set ID, the SRNC transmits the information on the CPCH set, received from the DRNC, to the UE through the RRC message, and the UE constructs a CPCH by preferentially applying the received information to overlapped information of the CPCH set information received over the BCH. For example, if the number of signatures available for a specific CPCH set is 16, the DRNC can allow the UE to use some of the 16 available signatures. The DRNC may provide the SRNC with information indicating that only 8 signatures are available for the UE, and upon receiving this information from the SRNC, the UE can access the CPCH set using only the allowed signatures. In this case, the DRNC can control the UE's right to use the CPCH set considering the current state of the cell.

The method for transmitting the CPCH set-related information can be equally applied even to the RACH and the FACH. The CPCH set can also be equally applied to the PRACH and the FACH, so the present invention is not restrictive to the CPCH, but can be applied to all of the common channels.

As described above, to select a common channel, the SRNC transmits information stored therein to the DRNC so that the DRNC may determine a proper common channel for the UE, thus increasing utilization efficiency of the common channel and providing various services. In particular, the CPCHs are given different characteristics according to CPCH sets, and then, the DRNC sets an effective CPCH set according to service requests from the UE, thus providing a high-quality service.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for setting a common channel for a packet data service by an SRNC (Serving Radio Network Controller) to a UE (User Equipment) through a Node B and a DRNC (Drift Radio Network Controller) when the UE is handed over from a first Node B to a second Node B as the UE moves to the second Node B, in a mobile communication system including the UE, the first Node B providing the packet data service to the UE, the SRNC connected to the first Node B, a CN (Core Network) connected to the SRNC, and the DRNC connected the second Node B neighboring the first Node B and also connected to the SRNC, wherein the CN has bit rate information for the packet data service and transmits the bit rate information to the SRNC, and the SRNC stores the bit rate information, the method comprising the steps of:

transmitting service parameters including the bit rate information for the packet data service to the DRNC;

receiving information on a common channel determined based on the service parameters from the DRNC; and transmitting information on the determined common channel to the UE through the DRNC and the second Node B, to allocate the determined common channel to the UE.

2. The method as claimed in claim 1, wherein the bit rate information includes a maximum bit rate and a guaranteed bit rate.

3. The method as claimed in claim 1, wherein the common channel is one of a common packet channel (CPCH), a random access channel (RACH) and a forward access channel (FACH).

4. A method for setting a common channel for a packet data service by an SRNC (Serving Radio Network Controller) to a UE (User Equipment) through a Node B and a DRNC (Drift Radio Network Controller) when the UE is handed over from a first Node B to a second Node B as the UE moves to the second Node B, in a mobile communication system including the UE, the first Node B providing the packet data service to the UE, the SRNC connected to the first Node B, a CN (Core Network) connected to the SRNC, and the DRNC connected the second Node B neighboring the first Node B and also connected to the SRNC, wherein the CN has bit rate information for the packet data service and transmits the bit rate information to the SRNC, and the SRNC stores the bit rate information, the method comprising the steps of:

transmitting service parameters including bit rate information for the packet data service to the DRNC using an RNSAP (Radio Network Subsystem Application Part) message;

receiving information on a common channel determined based on the service parameters through an RNSAP response message from the DRNC; and     transmitting the determined common channel information to the UE through a radio resource control message, to allocate the determined common channel to the UE.

5. The method as claimed in claim 4, wherein the RNSAP message includes a common transport channel resources request message.

6. The method as claimed in claim 4, wherein the RNSAP response message includes a common transport channel resources response message.

7. The method as claimed in claim 4, wherein the bit rate information includes a maximum bit rate and a guaranteed bit rate.

8. The method as claimed in claim 4, wherein the common channel is one of a common packet channel (CPCH), a random access channel (RACH), and a forward access channel (FACH).

9. A method for setting a common channel for a packet data service by an SRNC (Serving Radio Network Controller) to a UE (User Equipment) through a Node B and a DRNC (Drift Radio Network Controller) when the UE is handed over from a first Node B to a second Node B as the UE moves to the second Node B, in a mobile communication system including the UE, the first Node B providing the packet data service to the UE, the SRNC connected to the first Node B, a CN (Core Network) connected to the SRNC, and the DRNC connected the second Node B neighboring the first Node B and also connected to the SRNC, wherein the CN has bit rate information for the packet data service and transmits the bit rate information to the SRNC, and the SRNC stores the bit rate information, the method comprising the steps of:

determining service parameters including the bit rate information for the packet data service, determining a type of a common channel for transmitting packet data according to the determined service parameters, and then transmitting the determined service parameters and the determined common channel type to the DRNC;

receiving information on the common channel determined based on the service parameters and the common channel type from the DRNC; and     transmitting the received common channel information to the UE through the DRNC and the second Node B, to allocate the determined common channel to the UE.

10. The method as claimed in claim 9, wherein the bit rate information includes a maximum bit rate and a guaranteed bit rate.

11. The method as claimed in claim 9, further comprising the steps of:

upon receiving the service parameters and the common channel type from the SRNC, determining by the DRNC whether the received common channel type represents a random access channel (RACH);

determining a physical random access channel (PRACH) based on the service parameters, when the common channel type represents the random access channel; and     transmitting information on the determined physical random access channel and the determined random access channel as the common channel information to the SRNC.

12. The method as claimed in claim 9, further comprising the steps of:

determining by the DRNC a common packet channel (CPCH) set according to the service parameters, when the common channel type represents a common packet channel; and     transmitting information on the determined CPCH set and an ID (Identification) of the determined CPCH set as the common channel information to the SRNC.

\* \* \* \* \*